(12) United States Patent  (10) Patent No.: US 9,170,324 B2
Teter et al.  (45) Date of Patent: Oct. 27, 2015

(54) STATISTICAL MOVEMENT ANALYSIS

(71) Applicant: RAYTHEON COMPANY, Waltham, MA (US)

(72) Inventors: Marcus Alton Teter, Idaho Springs, CO (US); Mark Frank Tryon, Richardson, TX (US)

(73) Assignee: Raytheon Company, Waltham, MA (US)

( * ) Notice: Subject to any disclaimer, the term of this patent is extended or adjusted under 35 U.S.C. 154(b) by 405 days.

(21) Appl. No.: 13/856,567

(22) Filed: Apr. 4, 2013

(65) Prior Publication Data

US 2014/0300506 A1  Oct. 9, 2014

(51) Int. Cl.
*G01S 7/41* (2006.01)
*G01S 13/90* (2006.01)

(52) U.S. Cl.
CPC ............... *G01S 7/415* (2013.01); *G01S 7/412* (2013.01); *G01S 7/414* (2013.01); *G01S 13/9029* (2013.01)

(58) Field of Classification Search
CPC ..... G01S 7/415; G01S 13/9029; G01S 7/414; G01S 13/0209; G01S 13/5244; G01S 7/412
USPC .................. 342/25 B, 28, 104, 160–162, 195
See application file for complete search history.

(56) References Cited

U.S. PATENT DOCUMENTS

| | | | |
|---|---|---|---|
| 3,713,144 A * | 1/1973 | Letten et al. | 342/159 |
| 4,217,583 A | 8/1980 | Hiller et al. | |
| 4,907,001 A * | 3/1990 | Harmuth | 342/159 |
| 6,756,935 B1 | 6/2004 | Cameron et al. | |
| 6,911,933 B1 * | 6/2005 | Mutz et al. | 342/25 B |
| 6,937,746 B2 | 8/2005 | Schwartz | |
| 7,123,169 B2 | 10/2006 | Farmer et al. | |

(Continued)

FOREIGN PATENT DOCUMENTS

WO  WO 0208783 A1 *  1/2002

OTHER PUBLICATIONS

Setlur, P.; Amin, M.; Ahmad, F., "Urban target classifications using time-frequency micro-Doppler signatures," Signal Processing and Its Applications, 2007. ISSPA 2007. 9th International Symposium on , vol., no., pp. 1,4, Feb. 12-15, 2007.*

(Continued)

*Primary Examiner* — John B Sotomayor
(74) *Attorney, Agent, or Firm* — Burns & Levinson LLP; Joseph M. Maraia

(57) ABSTRACT

Statistical movement analysis method that includes defining one or more movement signature types, wherein a movement signature type includes a set of movement parameters and values for the set of movement parameters and receiving data for objects monitored by a radar system at a plurality of times, the data including values acquired for the set of movement parameters. The method also includes discriminating the data for the monitored objects by comparing movement signatures of two or more of the monitored objects for a difference of statistical significance and characterizing the monitored objects based on the movement signatures of the monitored objects. The method also includes identifying one or more of the monitored objects by comparing the received data for a monitored object with the movement signature type to determine if any of the objects monitored by the radar system are moving consistent with the movement signature type.

13 Claims, 7 Drawing Sheets

(56) References Cited

U.S. PATENT DOCUMENTS

| | | | |
|---|---|---|---|
| 7,486,229 B1 | 2/2009 | Govoni | |
| 2005/0237236 A1* | 10/2005 | Budic | 342/159 |
| 2006/0097910 A1* | 5/2006 | Collins et al. | 342/160 |
| 2010/0163621 A1 | 7/2010 | Ben-Asher et al. | |
| 2011/0006944 A1* | 1/2011 | Goldman | 342/25 A |
| 2014/0191900 A1* | 7/2014 | Uysal et al. | 342/25 B |
| 2014/0300506 A1* | 10/2014 | Teter et al. | 342/104 |

OTHER PUBLICATIONS

Deaett, M.A.; White, Z.T., "The statistical identification of motion anomalies in ground moving target radar imagery," Homeland Security (HST), 2012 IEEE Conference on Technologies for, vol., no., pp. 331,335, Nov. 13-15, 2012.*

\* cited by examiner

STATISTICAL MOVEMENT ANALYSIS

BACKGROUND

Existing ground moving target indicator (GMTI) analysis methods measure and display data. An analyst uses his/her eyes to determine signatures and meaning from the data. The results provided by the analysts are influenced by factors other than the fidelity of the data, such as experience, training, or organization bias. A need therefore exists for improved methods and systems for analyzing target movement.

SUMMARY

The technology described herein relates to target movement analysis. Data parameters associated with a GMTI target or collection of GMTI targets are treated as independent bands of data, like a spectrum. The sets of parameters (or spectrum) can be compared to a library of known data spectral signatures for identification.

One embodiment is a method for statistical movement analysis of parameters for objects monitored by a radar system that includes defining one or more movement signature types, wherein a movement signature type includes a set of movement parameters and values for the set of movement parameters. The method also includes receiving data for objects monitored by a radar system at a plurality of times, the data including values acquired for the set of movement parameters for the objects monitored by the radar system. The method also includes discriminating the data for the monitored objects by comparing movement signatures of two or more of the monitored objects for a difference of statistical significance. The method also includes characterizing the monitored objects based on the movement signatures of the monitored objects. The method also includes identifying one or more of the monitored objects by comparing the received data for a monitored object with the movement signature type to determine if any of the objects monitored by the radar system are moving consistent with the movement signature type.

In some embodiments, the method includes defining a plurality of movement signature types and comparing the received data with the plurality of movement signature types to identify which objects monitored by the radar system are moving consistent with which movement signature type. In some embodiments, the method includes characterizing one or more object groups within the objects monitored by the radar system based on the data for the set of movement parameters for the objects.

In some embodiments, the method includes identifying one or more of the objects monitored by the radar system as belonging to a first object group if the data for the set of movement parameters for the one or more objects are consistent with the movement signature type. In some embodiments, the set of movement parameters are averages of one or more of latitude, longitude, radial velocity, signal-to-noise ratio, arrival time or uncertainty for latitude, longitude, radial velocity, signal-to-noise ratio, or arrival time.

In some embodiments, a movement signature type includes movement parameters and values for the movement parameters for different points in time. In some embodiments, the method includes outputting data corresponding to a graphical representation of the movement signature type and the data for the movement parameters for the objects monitored by the radar system.

Another embodiment is a method for statistical movement analysis of parameters for objects monitored by a radar system that includes defining a milling movement signature, wherein the milling movement signature includes a set of movement parameters and values for the set of movement parameters. The method includes defining a herding movement signature, wherein the herding movement signature includes the set of movement parameters and values for the set of movement parameters. The method includes receiving data for objects monitored by a radar system at a plurality of times, the data including values acquired for the set of movement parameters for the monitored objects, wherein the set of movement parameters and values being the movement signature of a monitored object. The method includes characterizing the monitored objects at a plurality of times based on the movement signatures of the monitored objects. The method includes discriminating the data for the monitored objects at a plurality of times by comparing movement signatures of two or more of the monitored objects for a difference of statistical significance. The method includes identifying one or more of the monitored objects by comparing the received data for a monitored object with the milling movement signature and the herding movement signature to determine if the monitored object is moving consistent with the milling movement signature or the herding movement signature.

Another embodiment is a ground moving target indicator statistical movement analysis system that includes a processor, and a memory. The memory includes code representing instructions that when executed cause the processor to receive data for objects monitored by a radar system at a plurality of times, the data including values acquired for a set of movement parameters for the monitored objects, wherein the set of movement parameters and values being the movement signature of a monitored object. The memory includes code representing instructions that when executed cause the processor to characterize the monitored objects based on the movement signatures of the monitored objects. The memory includes code representing instructions that when executed cause the processor to discriminate the data for the monitored objects by comparing movement signatures of two or more data objects for a difference of statistical significance. The memory includes code representing instructions that when executed cause the processor to identify one or more of the monitored objects by comparing the objects' movement signatures with one or more movement signature types to determine if any of the objects monitored by the radar system are moving consistent with the one or more movement signature types.

In some embodiments, the memory includes code representing instructions that when executed cause the processor to assign one or more of the objects monitored by the tracking system to a first object group if the movement parameters for the one or more objects are consistent with a movement signature associated with the first object group. In some embodiments, the movement parameters are averages of one or more of latitude, longitude, radial velocity, signal-to-noise ratio, arrival time or uncertainty for latitude, longitude, radial velocity, signal-to-noise ratio, or arrival time.

In some embodiments, a movement signature includes movement parameters and values for the movement parameters for different points in time. In some embodiments, the system includes an output for displaying a graphical representation of the movement signature and the data for the movement parameters for the objects monitored by the radar system.

The movement analysis methods and systems described herein (hereinafter "technology") can provide one or more of the following advantages. One advantage of the technology is that quantitative analysis can be performed on the movement data because the data is treated as bands of data, like a spectrum. Another advantage of the technology is that spectral analysis techniques can be applied in analyzing the movement of objects because the data is treated like a spectrum.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

Figure 1:
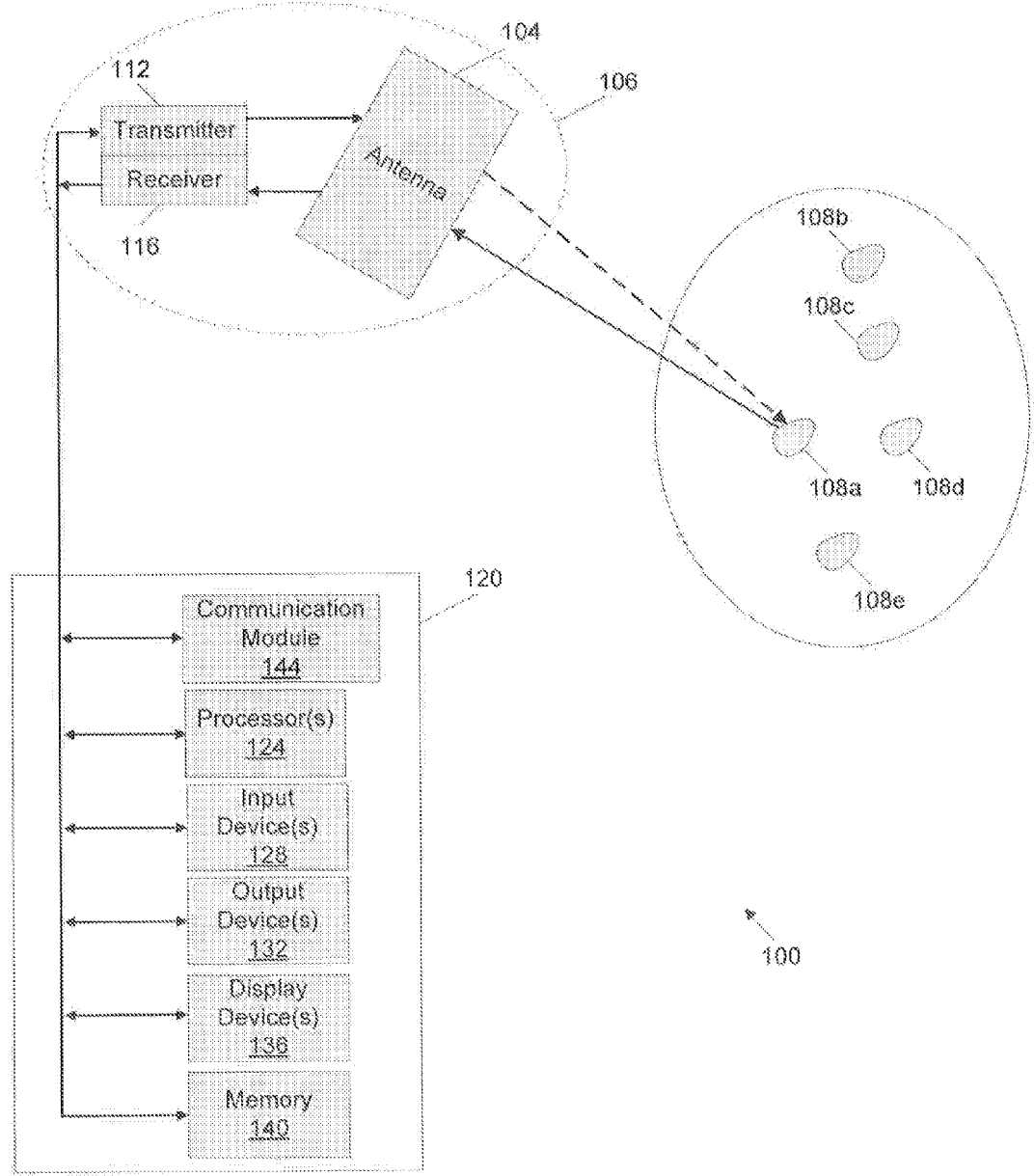
FIG. 1 is a schematic illustration of a ground moving target statistical movement system, according to an illustrative embodiment.

FIG. 1 is a schematic illustration of a ground moving target statistical movement analysis system 100, according to an illustrative embodiment. The system 100 includes a radar antenna 104, a transmitter 112, a receiver 116, a control module 120, and a plurality of objects 108a, 108, 108c, 108d, and 108e (generally 108). The antenna 104, transmitter 112, and the receiver 116 are components of a movement tracking system 106. System 100 determines the movement and/or other parameters associated with the objects 108 based on one of a variety of principles, including, for example, the Doppler effect when using a Doppler radar system as the movement tracking system 106. A moving object will be at a different distance from the radar antenna as the object moves. The phase of the radar return from the object will be different for successive pulses. The returns from stationary clutter/objects will arrive at the same phase shift between successive radar pulses.

The control module 120 includes a communication module 144, one or more input devices 128, one or more output devices 132, one or more display devices 136, one or more processors 124, and memory 140. The modules and devices described herein can, for example, utilize the processor 124 to execute computer executable instructions and/or the modules and devices described herein can, for example, include their own processor to execute computer executable instructions. It should be understood the control module 120 can include, for example, other modules, devices, and/or processors known in the art and/or varieties of the described modules, devices, and/or processors.

The communication module 144 includes circuitry and code corresponding to computer instructions that enable the computing device to send/receive signals to/from the antenna 104. For example, the communication module 144 provides commands from the processor 124 to the transmitter 112 to control how the antenna 104 transmits radar pulses during operation. In some embodiments, the system 100 uses alternative components and system to measure movement data for the objects 108. For example, in some embodiments, the movement tracking system 106 instead (or in addition) includes a camera system or other optical capture system to track movement of the objects 108. The communication module 144 also, for example, receives data corresponding to the radar return pulses received by the receiver 116. The received data can be, for example, stored by the memory 140 or otherwise processed by the processor 124.

The input devices 128 receive information from a user (not shown) and/or another computing system (not shown). The input devices 128 can include, for example, a keyboard, a scanner, a microphone, a stylus, a touch sensitive pad or display. The output devices 132 output information associated with the control module 120 (e.g., information to a printer, information to a speaker, information to a display, for example, graphical representations of information). The processor 124 executes the operating system and/or any other computer executable instructions for the control module 120 (e.g., executes applications). The memory 140 stores a variety of information/data, including profiles used by the control module 120 to specify how the system 100 analyzes the movement of the objects 108. The memory 140 can include, for example, long-term storage, such as a hard drive, a tape storage device, or flash memory; short-term storage, such as a random access memory, or a graphics memory; and/or any other type of computer readable storage.

Figure 2:
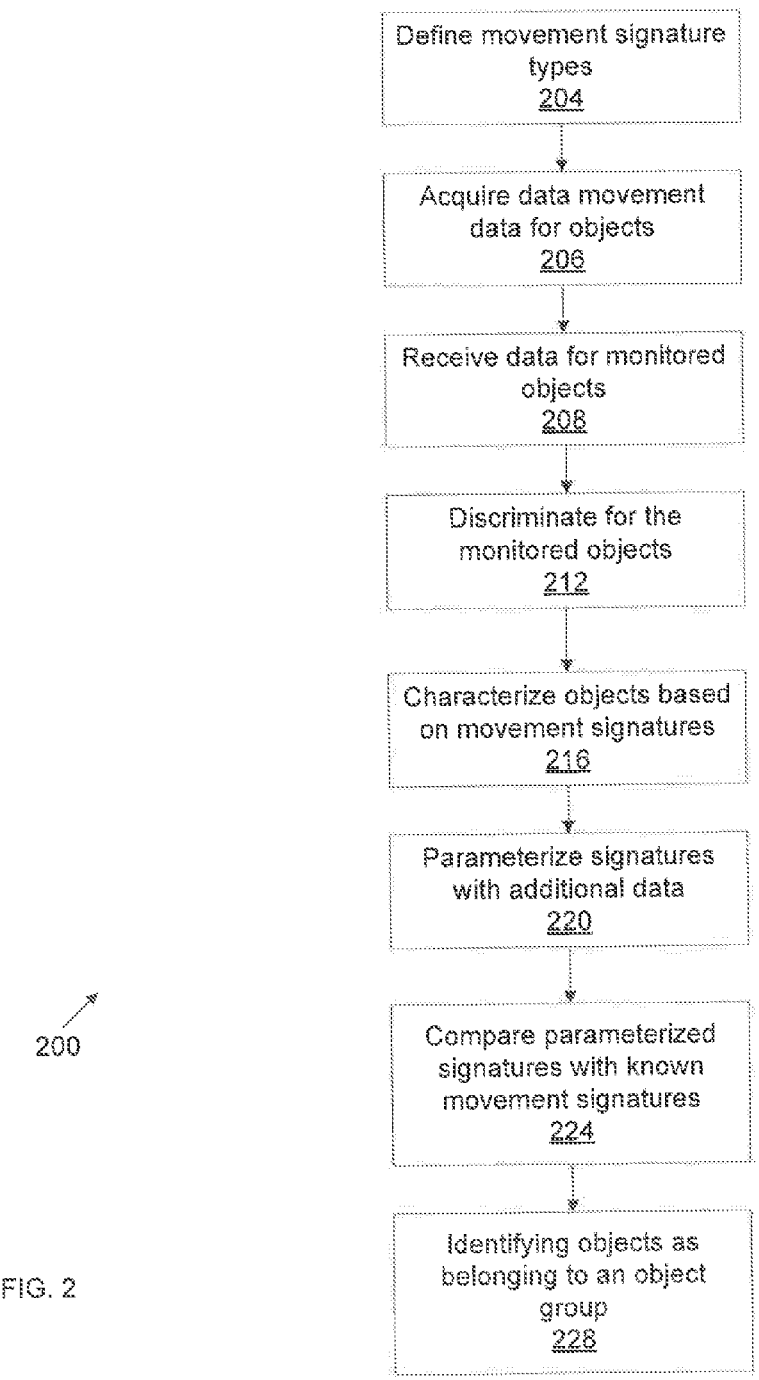
FIG. 2 is a flowchart of a method for analyzing movement of objects, according to an illustrative embodiment.

FIG. 2 is a flowchart 200 of a method for analyzing the movement of objects, according to an illustrative embodiment. The method can be implemented using, for example, the system 100 of FIG. 1. The method includes defining one or more movement signature types (step 204) to be used by the method. A movement signature type includes a set of movement parameters and values for the set of movement parameters. For the purposes of these embodiments, movement parameters used in a movement signature can also include other parameters that describe the objects of interest. Other parameters can include, for example, exhaust parameters for an object, color, temperature, or any other measurable or discernible property of interest that can be used to distinguish between different objects. A movement signature type is used to classify a particular kind of movement for objects of interest.

In one embodiment, milling is a movement signature type that relates to, for example, radar returns occurring within the same generally confined geospatial area, but in an incoherent manner so that each return may not be from the same object. Milling is movement signature type illustrative of group movement of a set of objects. In another embodiment, herding is a movement signature type also representing group movement; however, the movement of the group undergoes geospatial area drifts as a function of time.

Alternative movement signature types exist and can be defined, depending on the particular motion of objects as, for example defined by an operator, a processor, or a combination thereof. A non-exhaustive list of other types of exemplary signatures is included in Table 1.

TABLE 1

Exemplary Movement Signature Types

| Signature Type - Name | Description |
|---|---|
| Tracks | Coherent multi-location position signature of a single object arranged such that a clear path from one location to the next is unambiguous |
| Traffic | Incoherent multi-location position signature of multiple different objects usually confined to road networks showing a rate of flow of the objects that is not trackable |
| Aircraft | A fast moving track for an object that does not conform to terrain in the area of the object |
| Static Rotator | Repeating signature pattern at a geolocation having both advancing and retreating components |

Exemplary movement parameters for movement signature types include, for example, one or more of latitude, longitude, radial velocity, signal-to-noise ratio, arrival time, or uncertainty for latitude, longitude, radial velocity, signal-to-noise ratio, arrival time, centroid position, velocity, or centroid velocity. In some embodiments, averages, minimum, or maximum values of these parameters are used for specifying the movement parameters. Table 2 illustrates exemplary values for an embodiment of the technology in which two movement signature types are used. For example, the centroid position of a group of objects that exhibit a milling movement signature type is generally fixed over time. However, the centroid position of a group of objects that exhibit a herding movement signature type is generally moving or changing over time. In Table 2, some of the values are not precise values; rather, they are broad, textual descriptions (e.g., "moving", rather than a specific velocity value). In some embodiments, specific values (e.g., 1, 10, 25.2) or ranges (e.g., 1-10, 115-170, 132.3-199.9) are used as the values.

TABLE 2

Movement Parameter Values

| Movement Parameter | Milling | Herding |
|---|---|---|
| Centroid position | Fixed | Moving |
| Average speed | Non-zero | Non-zero |
| Centroid velocity | Zero | Non-zero |
| Average SNR | Fixed | Fixed |

The movement signatures can be treated as spectrum. In some embodiments, the signatures are treated as spectra having the following forms:

$$\beta_1(\theta, \phi, \sigma_\theta, \sigma_{100}, v, \sigma_v) \qquad \text{EQN. 1}$$

where θ is longitudinal position of an object, φ is latitudinal position of the object, $\sigma_\theta$ is uncertainty of the longitudinal position of the object, $\sigma_\phi$ is uncertainty of the latitudinal position of the object, v is velocity of the object, and $\sigma_v$ is uncertainty of the velocity of the object; or $$\beta_2(\theta_{avg}, \phi_{avg}, \sigma_{avg\theta}, \sigma_{avg\phi}, v_{avg}, \sigma_{avgv}) \qquad \text{EQN. 2}$$

where $\theta_{avg}$ is the average longitudinal position of an object, $\phi_{avg}$ is the average latitudinal position of the object, $\sigma_{avg\theta}$ is the average uncertainty of the longitudinal position of the object, $\sigma_{avg\phi}$ is the average uncertainty of the latitudinal position of the object, $v_{avg}$ is the average velocity of the object, and $\sigma_{avgv}$ is the average uncertainty of the velocity of the object; or $$\beta_3(\theta_{t1}, \theta_{t2}, \theta_{t3}, \theta_{t4}, \phi_{t1}, \ldots, v_{t1}, \ldots, \sigma_{\theta t1}, \ldots, \sigma_{100\ t1}, \ldots, \sigma_{vt1}, \ldots) \qquad \text{EQN. 3}$$

where $\theta_{t1}$ is the longitudinal position of an object at time t1, $\theta_{t2}$ is the longitudinal position of an object at time t2, $\theta_{t3}$ is the longitudinal position of an object at time t3, and $\theta_{t4}$ is the longitudinal position of an object at time t4. Similarly, $\phi_{t1}$ is the latitudinal position, $v_{t1}$ is the velocity, and σ are the uncertainties.

The flowchart 200 of FIG. 2 illustrates that the method also includes receiving data for objects (step 208) monitored by a radar system at a plurality of times (e.g., the movement tracking system 106 of FIG. 1). The radar system acquires (step 206) the movement data for the objects (e.g., objects 108a, 108b, 108c, 108d, and 108e of FIG. 1). The acquired data includes values for the set of movement parameters for the objects (e.g., centroid position, average speed, centroid velocity, average SNR).

The method also includes discriminating the data for the monitored objects (step 212). In one embodiment, discriminating the data includes comparing movement signatures of two or more of the monitored objects for a difference of statistical significance. Discriminating the data involves analyzing the data to distinguish one moving activity from another moving activity. One exemplary discrimination analysis technique involves a method that decides which of two discrete, mutually exclusive hypotheses is correct. The technique expresses the probability that the chosen hypothesis is correct, given that exactly one of the hypotheses is correct. Other discrimination analysis techniques can be employed. For example, linear discriminant analysis techniques or principal component analysis techniques can be applied. Linear discriminant analysis is a technique in which a linear combination of parameters is used to characterize or separate two or more classes of objects. Principal component analysis is a technique that determines which linear combinations of variables best explain the data.

For example, in one implementation we have a milling group defined by its average positions—$x_{AVE}$, $y_{AVE}$, distribution of positions—$\sigma_x$, $\sigma_y$ (standard deviation), average speed—$v_{AVE}$, and distribution of speed—$\sigma_v$ (standard deviation). We also have another trial dot/object classified by position—$x_t$, $y_t$, uncertainty in position—$\sigma_{xt}$, $\sigma_{yt}$, speed—$v_t$, and uncertainty in speed—$\sigma_{vt}$ established by measurements acquired by a radar. If the trial dot is part of the milling group, then we compare the average position and average speed of the milling group with the position and speed of the trial dot. A convenient way to do this is using the chi squared statistic, and we start by asking the null hypothesis: is the trial dot not part of the milling group? The calculation of the chi squared statistic is performed in accordance with:

$$X^2 = \Sigma_{i=1}^n (a_i - \mu_i)^2 / \sigma_i^2 \qquad \text{EQN. 4}$$

So for this case the sum is determined in accordance with:

$$X^2 = (x_t - x_{AVE})^2 / (\sigma_{xt}^2 + \sigma_x^2) + (y_t - y_{AVE})^2 / (\sigma_{yt}^2 + \sigma_y^2) + (v_t - v_{AVE})^2 / (\sigma_{vt}^2 + \sigma_v^2) \qquad \text{EQN. 5}$$

Using an example where $x_{AVE}$=11.1 m, $y_{AVE}$=13.2 m, $v_{AVE}$=0.7 m/s, $\sigma_x$=0.1 m, $\sigma_y$=0.1 m, $\sigma_v$=0.2 m/s, $x_t$=11.5 m, $y_t$=13.1 m, $v_t$=1.1 m/s, $\sigma_{xt}$=0.2 m, $\sigma_{yt}$=0.2 m, and $\sigma_{vt}$=0.5 m/s, the value of chi squared is 3.95 with 3 degrees of freedom. The probability that the trial dot is not part of the milling group is 0.74, which is somewhat higher than the nominal probability of 0.68. This means that the trial dot is likely not part of the milling group. If the probability were higher, say 0.9, then the confidence of the null hypothesis is higher. If the probability were lower, say 0.5, then the confidence of the null hypothesis is lower, suggesting that it is reasonable to conclude that the trial dot is part of the milling group.

Figure 3:
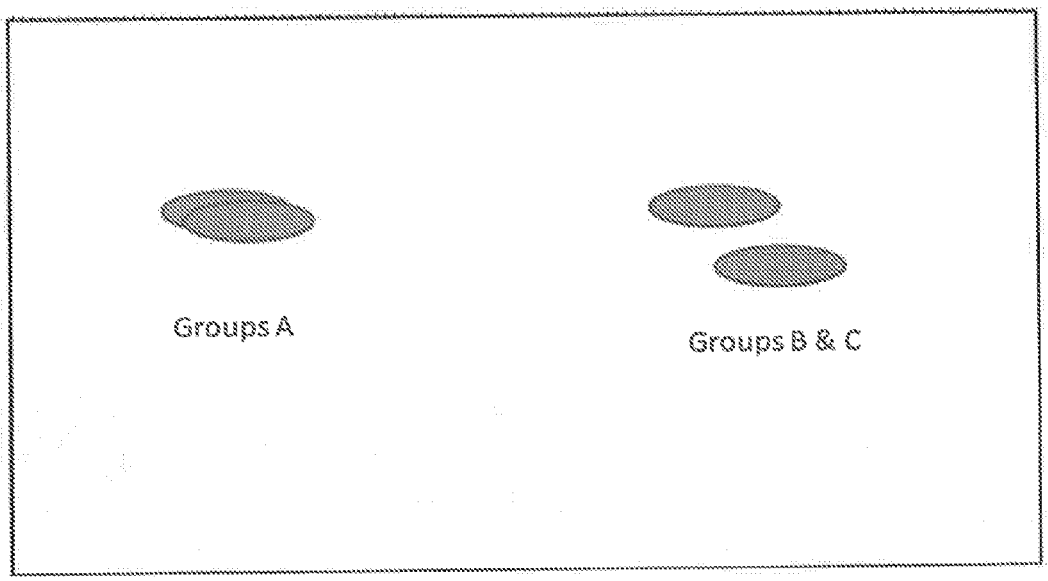
FIG. 3 is a graphical illustration depicting discrimination between movement signatures, according to an illustrative embodiment.

FIG. 3 is a graphical illustration depicting discrimination between movement signatures. The signatures depicted on the left shows the groups A that may not be able to be discriminated because they overlap, but the signatures on the right (groups B & C) are able to be discriminated because they do not overlap. Using statistical significance and a null hypothesis formulation, groups A are different with a high significance. This indicates that there is a high probability that the two are not different. Similarly, groups B & C are different with a low significance. This indicates that there is a low probability that the two are not different. The movement signatures in FIG. 3 could represent, for example, a movement signature type in which the movement parameter is the geolocation of the object(s). This would mean that the movement signatures for B & C are able to be discriminated from each other simply because they are separated in position only.

When one movement signature can be distinguished from another movement signature, monitored objects can be characterized based on the movement signatures of the objects (step 216). Characterization can involve, for example, establishing what is the movement type of a one or more moving objects. In some embodiments, characterization involves characterizing one or more object groups within the objects monitored by the radar system based on the data for the set of movement parameters for the objects. Different object groups may be used to distinguish between, for example, subclass distinctions (e.g., multiple groups, one group for each type of moving vehicle).

Once a movement signature is discriminated from another signature, a full parameterization of that signature can be constructed (step 220). In one embodiment, described above with respect to FIG. 3, the system and method were able to discriminate individual signatures from each other using a single parameter such as location or speed. Collecting all of the single parameters for the signature is the first step in characterization. Multiple parameters of ground moving target indicator movement parameters can be collected together with averages and distributions to form a combined movement signature. In some embodiments, the characterized movement signature has the following parameters:

Average geolocation
Average geolocation uncertainty
Average speed
Average speed uncertainty
Average time
Average time uncertainty
Average SNR
Centroid velocity
Centroid velocity uncertainty Each of the above forms a characterized set of movement parameters for the movement signature. The above forms a nine dimensional 'spectrum' for the movement signature. As additional calculations are performed and more data sources are fused with the signature data, the movement signatures can be characterized to an N-dimensional parameterization. This is functionally equivalent to the spectral characterization of measuring the average reflectance in any number of spectral bands.

In spectral analysis, the next step is to compare the characterized spectrum with a database of known spectra (step 224) in order to identify the spectrum with corresponding entries in the database. Those entries are usually identified with a set of data that could be the source for the measured spectra. For a characterized set of parameters representing a movement signature, the set of parameters can be compared with a database containing parameterizations of known movement signatures. The set of these known signatures form a GMTI movement signature library. The comparison of a measured signature to known signatures types describes the next step to the identification of GMTI movement types.

For example, in one embodiment a library signature is defined by the size of the distribution—$\Delta_x$, $\Delta_y$, and its average speed, $v_{AVE}$. A trial signature has a size $\Delta_{xt}$, $\Delta_{yt}$, and average speed $V_{tAVE}$. One means of comparing the two signatures is the spectral method called the Euclidean distance, defined by:

$$\sqrt{\Sigma_{i=1}^{n}(a_i-b_i)^2}.\qquad\text{EQN. 6}$$

For this case the distance will be determined in accordance with:

$$d=\text{sqrt}((\Delta_x-\Delta_{xt})^2+(\Delta_y-\Delta_{yt})^2+(v_{AVE}-v_{tAVE})^2)\qquad\text{EQN. 7}$$

The Euclidean distance can be thresholded to the desired level to indicate a spectral match. For example a distance of 0.1 might be considered good, where a distance of 0.5 is considered marginal.

In some embodiments, the method of flowchart 200 involves defining a plurality of movement signature types (step 204) and comparing the received data with the plurality of movement signature types to identify which objects monitored by the radar system are moving consistent with which movement signature type (step 224). In this embodiment, the method also includes identifying one or more of the objects monitored by the radar system as belonging to a first object group if the data for the set of movement parameters for the one or more objects are consistent with the movement signature type (step 228).

In some examples, the database of known movement signatures is defined as a signature library. The library is formed from the knowledge of the signatures seen within a type of phenomenology. For example, in one embodiment, a signature library (also referred to as a spectral signature library) contains a database of laboratory measured signatures. An accurate and complete signature library aids in the identification process (i.e., identification of the object(s)) being analyzed.

In some embodiments, the signature library includes tabular and graphical elements that can be used for comparison. The tabular elements show the values of the movement parameters that define the movement signature (e.g., Table 2). In some instances, the tables will include information relating to the accuracy of the defined signature. Furthermore, the tabular elements may be sensor specific, taking into account the ability of particular sensors being able to identify some movement signatures and the possibility that movement signatures may have different parameters for different signatures.

In addition to the tabular elements of the signature library, there may be graphical elements. In some embodiments, the spectral analysis libraries contain graphs of the target spectra. These graphs are used as a one-to-one comparison for measured spectra, and as a planning tool to determine the kind of data needed to measure a particular object's spectrum. For movement signatures, these graphical elements will be graphs of the particular parameters as they relate to the movement signature. Furthermore, a geospatial graphic can be used as pictorial representation of the signature.

Figure 4:
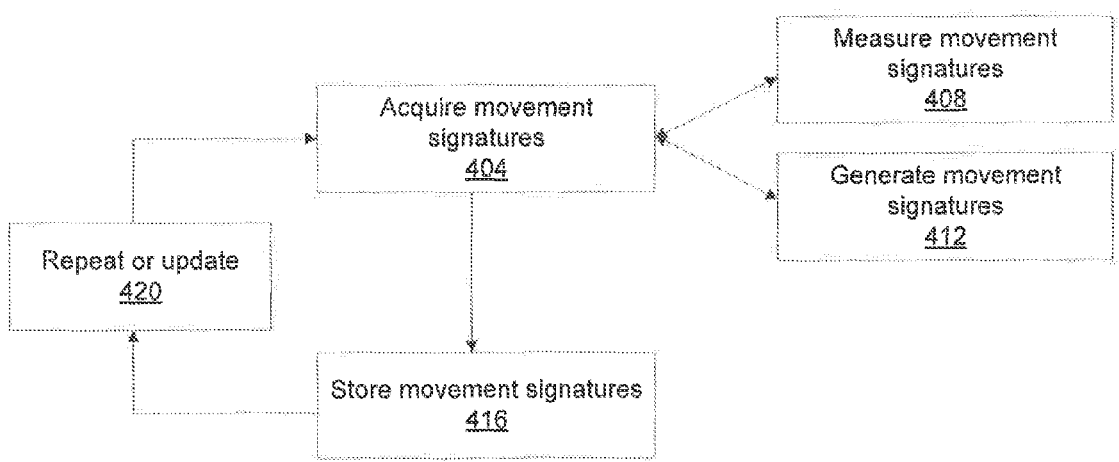
FIG. 4 is a flowchart of a method for generating or updating a movement signature library, according to an illustrative embodiment.

FIG. 4 is a flowchart 400 of a method for generating or updating a movement signature library, according to an illustrative embodiment. In one embodiment, the method is implement using the control module 120 and movement tracking system 106 of FIG. 1. The method includes acquiring movement signatures (step 404) for objects of interest. Various methods can be used to acquire the movement signatures. In this embodiment, movement signatures are acquired by measuring movement parameter data for the movement signatures (step 408). The measurements can be performed, for example, in a laboratory setting or in the field (e.g., using installed radar equipment). In this embodiment, movement signatures are also acquired by generating the movement signatures (step 412). Movement signatures can be generated by computer modeling or simulation. For example, a movement signature of a rocket may be based on analytical assumptions as to the speed and trajectory of a known type of rocket. The analytical assumptions can be used to generate the movement signature.

The method also includes storing the movement signatures (step 416). The movement signatures can be stored in, for example, memory 140 of the control module 120 of FIG. 1. In this embodiment, the method also includes repeating (step 420) the steps to add additional movement signatures or to update existing signatures based on, for example, new movement parameter data that may become available.

Figure 5A:
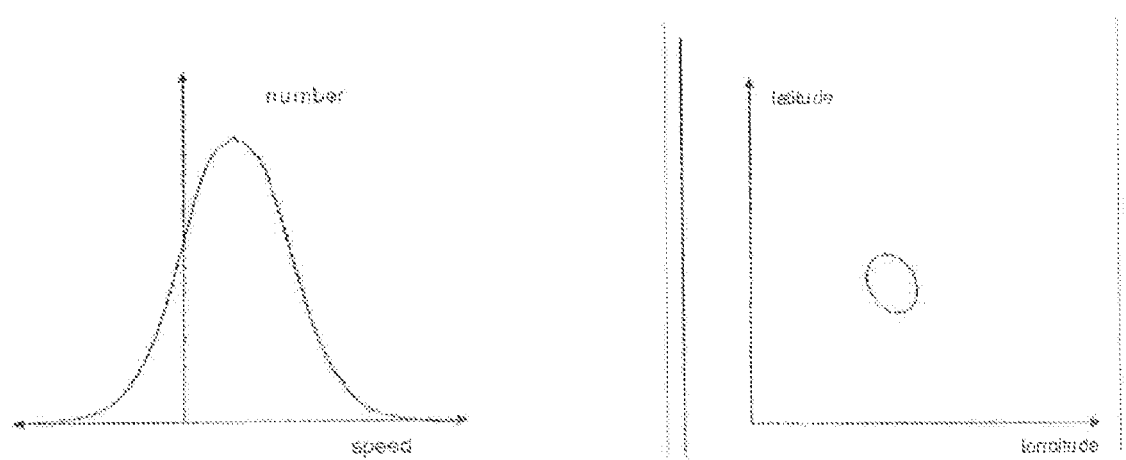
FIG. 5A are graphs of a milling movement signature, according to an illustrative embodiment.
Figure 5B:
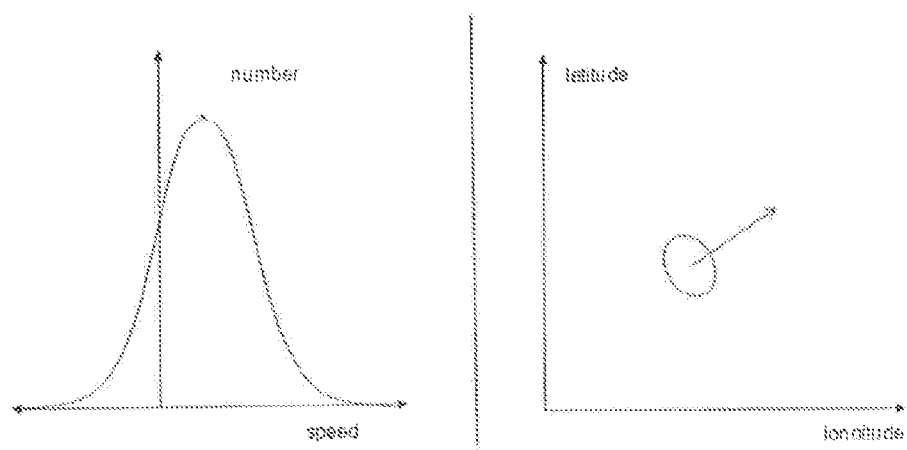
FIG. 5B are graphs of a herding movement signature, according to an illustrative embodiment.

FIGS. 5A and 5B illustrate movement parameter data used in a hypothetical example that involves a milling movement signature and a herding movement signature. FIG. 5A includes graphs of a milling movement signature, according to an illustrative embodiment. The plot to the left in FIG. 5A shows the distribution of speeds for the milling signature. The symmetric distribution shows a range of object speeds and the average of the speed distribution for the objects is non-zero. The plot to the right in FIG. 5A shows the pictorial representation of the milling geospatial distribution (latitude and longitude positions). It shows that the distribution is generally confined to the specific area. FIG. 5B includes graphs of a herding movement signature, according to an illustrative embodiment. The plot to the left in FIG. 5B shows the distribution of speeds contained for the herding signature. Like the milling signature, the herding distribution is symmetric and it is not centered at zero. The plot to the right in FIG. 5B shows the herding signature geospatial distribution (latitude and longitude positions). The vector illustrated in the figure shows the centroid velocity vector; showing movement of the centroid of the objects. In some embodiments, the graphs of FIGS. 5A and 5B are output by the system (e.g., system 100 of FIG. 1) as a graphical representation of the movement signature type and the data for the movement parameters for objects monitored by the radar system.

Figure 6:
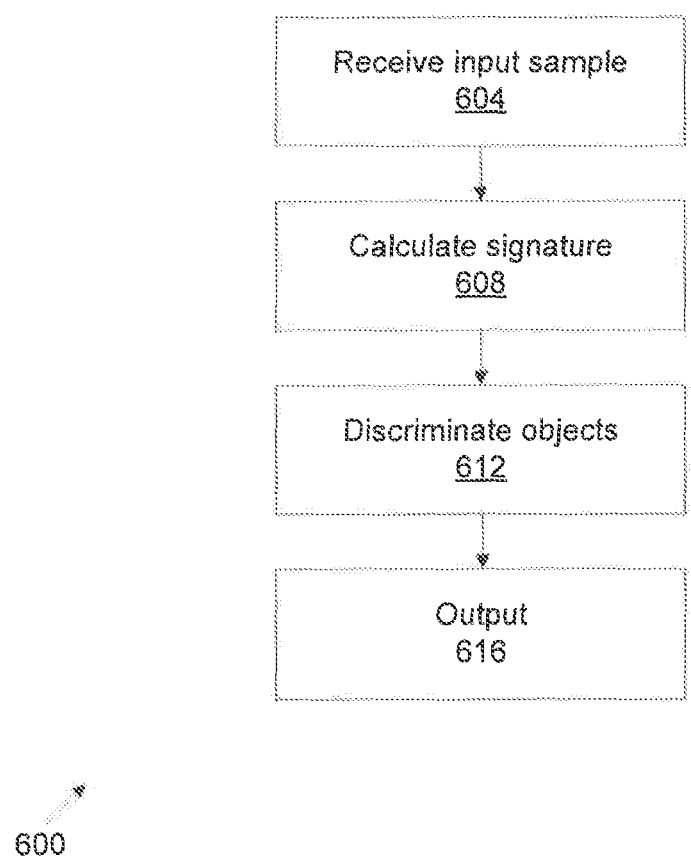
FIG. 6 is a flowchart of a method for identifying objects moving in accordance with a milling movement signature, according to an illustrative embodiment.

FIG. 6 is a flowchart 600 of a method for identifying objects moving in accordance with a milling movement signature, according to an illustrative embodiment. The method includes receiving an input sample (step 604). The input sample data (i.e., movement parameter data) includes the location of the geocenter of the sample along with the distribution of the sample in the form of an error ellipse. In addition, it includes an average speed and distribution of the speeds in the form of a standard deviation. The sample also includes an average SNR and a standard deviation of the SNR.

The signature is calculated by performing a statistical analysis on the input sample data (step 608). The compiled input sample data is used for the milling signature.

After the mathematical distribution of the milling signature has been determined, it is used as an input to a traditional spectral matched filter. Each individual object can be compared to the milling signature (step 612) using a traditional chi squared test with four degrees of freedom. Each object's position and position uncertainty, speed and speed uncertainty, and SNR and SNR uncertainty are input into the traditional chi squared formula, generating a chi squared value. Each chi squared value is then used to generate a probability that the object and the signature are different and that their measured chi squared value is small by chance. The probabilities are then filtered to produce any desired cut-off. The method then includes outputting (step 616) the results. The output of the method may be, for example, stored in memory or provided to an operator for review.

Figure 7:
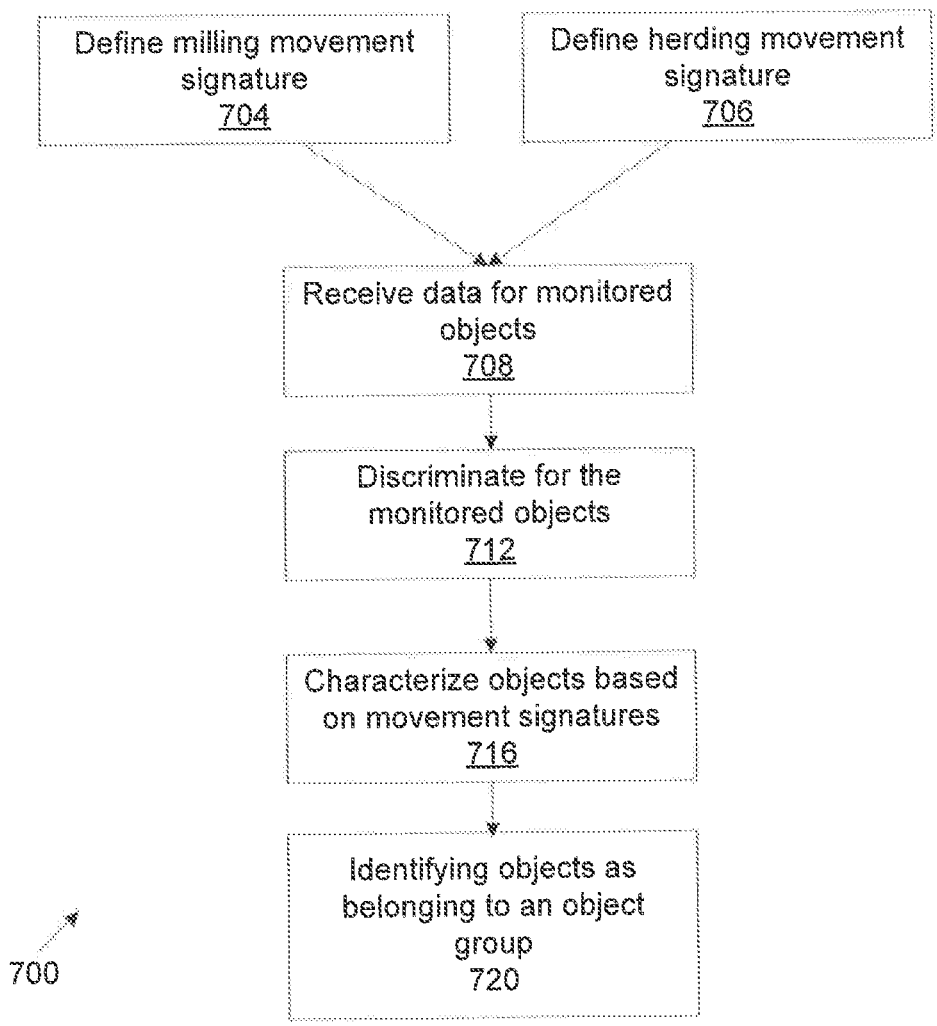
FIG. 7 is a flowchart of a method for identifying whether objects are moving in accordance with a milling movement signature or a herding movement signature, according to an illustrative embodiment.

FIG. 7 is a flowchart 700 of a method for identifying whether objects are moving in accordance with a milling movement signature or a herding movement signature, according to an illustrative embodiment. The method can be implemented using, for example, the system 100 of FIG. 1. The method includes defining a milling movement signature (step 704) and a herding movement signature (step 706). The milling movement signature includes the movement parameters and values provided in Table 2. The herding movement signature includes the movement parameters and values provided in Table 2. Next, the method includes receiving data for objects (step 708) monitored by the radar system 106 at a plurality of times.

The method also includes discriminating the data for the monitored objects (step 712) by comparing the movement signatures of two or more of the monitored objects for a difference of statistical significance. When the movement signatures can be distinguished from each other, the monitored objects can be characterized based on the movement signatures of the objects (step 716). In this embodiment, characterization involves establishing what is the movement type of the moving objects. In this embodiment, the method includes identifying which of the objects monitored by the radar system belong to a milling movement group and which belong to herding movement group (step 720). For example, the group of objects that has a fixed centroid position, a non-zero average speed, a zero velocity centroid velocity, and a fixed signal-to-noise ration belong to the milling movement group.

The above-described systems and methods can be implemented in digital electronic circuitry, in computer hardware, firmware, and/or software. The implementation can be as a computer program product that is tangibly embodied in non-transitory memory device. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for statistical movement analysis of parameters for objects monitored by a radar system, comprising:
    defining one or more movement signature types, wherein a movement signature type includes a set of movement parameters and values for the set of movement parameters;
    receiving data for objects monitored by a radar system at a plurality of times, the data including values acquired for the set of movement parameters for the objects monitored by the radar system;
    discriminating the data for the monitored objects by comparing movement signatures of two or more of the monitored objects for a difference of statistical significance;
    characterizing the monitored objects based on the movement signatures of the monitored objects; and
    identifying one or more of the monitored objects by comparing the received data for a monitored object with the movement signature type to determine if any of the objects monitored by the radar system are moving consistent with the movement signature type.

2. The method of claim 1, comprising defining a plurality of movement signature types and comparing the received data with the plurality of movement signature types to identify which objects monitored by the radar system are moving consistent with which movement signature type.

3. The method of claim 1, comprising characterizing one or more object groups within the objects monitored by the radar system based on the data for the set of movement parameters for the objects.

4. The method of claim 1, comprising identifying one or more of the objects monitored by the radar system as belonging to a first object group if the data for the set of movement parameters for the one or more objects are consistent with the movement signature type.

5. The method of claim 1, wherein the set of movement parameters are averages of one or more of latitude, longitude, radial velocity, signal-to-noise ratio, arrival time or uncertainty for latitude, longitude, radial velocity, signal-to-noise ratio, or arrival time.

6. The method of claim 1, wherein a movement signature type includes movement parameters and values for the movement parameters for different points in time.

7. The method of claim 1, comprising outputting data corresponding to a graphical representation of the movement signature type and the data for the movement parameters for the objects monitored by the radar system.

8. A method for statistical movement analysis of parameters of objects monitored by a radar system, comprising:
    defining a milling movement signature, wherein the milling movement signature includes a set of movement parameters and values for the set of movement parameters;
    defining a herding movement signature, wherein the herding movement signature includes the set of movement parameters and values for the set of movement parameters;
    receiving data for objects monitored by a radar system at a plurality of times, the data including values acquired for the set of movement parameters for the monitored objects, wherein the set of movement parameters and values being the movement signature of a monitored object;
    discriminating the data for the monitored objects at a plurality of times by comparing movement signatures of two or more of the monitored objects for a difference of statistical significance;
    characterizing the monitored objects at a plurality of times based on the movement signatures of the monitored objects; and
    identifying one or more of the monitored objects by comparing the received data for a monitored object with the milling movement signature and the herding movement signature to determine if the monitored object is moving consistent with the milling movement signature or the herding movement signature.

9. A ground moving target indicator statistical movement analysis system; comprising:
    a processor; and
    a memory, the memory including code representing instructions that when executed cause the processor to:
        receive data for objects monitored by a radar system at a plurality of times, the data including values acquired for a set of movement parameters for the monitored objects, wherein the set of movement parameters and values being the movement signature of a monitored object,
        discriminate the data for the monitored objects by comparing movement signatures of two or more data objects for a difference of statistical significance,
        characterize the monitored objects based on the movement signatures of the monitored objects,
        identify one or more of the monitored objects by comparing the objects' movement signatures with one or more movement signature types to determine if any of the objects monitored by the radar system are moving consistent with the one or more movement signature types.

10. The system of claim 9, wherein the memory includes code representing instructions that when executed cause the processor to assign one or more of the objects monitored by the tracking system to a first object group if the movement parameters for the one or more objects are consistent with a movement signature associated with the first object group.

11. The system of claim 9, wherein the movement parameters are averages of one or more of latitude, longitude, radial velocity, signal-to-noise ratio, arrival time or uncertainty for latitude, longitude, radial velocity, signal-to-noise ratio, or arrival time.

12. The system of claim 9, wherein a movement signature includes movement parameters and values for the movement parameters for different points in time.

13. The system of claim 9, comprising an output for displaying a graphical representation of the movement signature and the data for the movement parameters for the objects monitored by the radar system.

* * * * *